US010943618B1

United States Patent
Kot et al.

(10) Patent No.: US 10,943,618 B1
(45) Date of Patent: Mar. 9, 2021

(54) ETHEREUM STATE DATA STORAGE OPTIMIZATION METHOD, ETHEREUM SYSTEM AND STORAGE MEDIUM

(71) Applicant: Wang Chau Tyler Kot, Hong Kong (HK)

(72) Inventors: Wang Chau Tyler Kot, Hong Kong (HK); Xiong Hui Guo, Hong Kong (HK); Xing Li, Hong Kong (HK)

(73) Assignee: Wang Chau Tyler Kot, Hong Kong (HK)

( * ) Notice: Subject to any disclaimer, the term of this patent is extended or adjusted under 35 U.S.C. 154(b) by 0 days.

(21) Appl. No.: 16/843,985

(22) Filed: Apr. 9, 2020

Related U.S. Application Data

(63) Continuation of application No. PCT/CN2020/080288, filed on Mar. 19, 2020.

(51) Int. Cl.
*G06F 16/00* (2019.01)
*G11B 20/00* (2006.01)
*G06F 16/22* (2019.01)
*G11B 20/10* (2006.01)
*G06F 16/901* (2019.01)
*G06Q 10/10* (2012.01)

(52) U.S. Cl.
CPC .... *G11B 20/00007* (2013.01); *G06F 16/2246* (2019.01); *G06F 16/2272* (2019.01); *G06F 16/9027* (2019.01); *G11B 20/10481* (2013.01); *G06Q 10/10* (2013.01)

(58) Field of Classification Search
CPC .................................................. G06F 16/9027
See application file for complete search history.

(56) References Cited

U.S. PATENT DOCUMENTS

| 2019/0251124 A1* | 8/2019 | Pan | .................. G06F 16/901 |
| 2020/0044824 A1* | 2/2020 | Xie | .................. G06Q 20/065 |

FOREIGN PATENT DOCUMENTS

| CN | 102156759 A | 8/2011 |
| CN | 106897119 A | 6/2017 |
| CN | 109359159 A | 2/2019 |
| CN | 110427376 A | 11/2019 |

OTHER PUBLICATIONS

International Search Report of PCT Patent Application No. PCT/CN2020/080288 dated Dec. 23, 2020.

* cited by examiner

*Primary Examiner* — Ajith Jacob

(57) ABSTRACT

Disclosed are an Ethereum state data storage optimization method, an Ethereum state data storage optimization system, and an Ethereum system. The method includes: using an MPT tree structure to store Ethereum state data; and compressing a height of an MPT tree, so as to reduce the number of times of disk io. By increasing capacity of a branch node, optimization in a horizontal direction can be performed to the MPT tree of Ethereum state data; by compressing the height of the MPT tree of the Ethereum state data on a single prefix path, optimization in a vertical direction can be performed to the MPT tree of the Ethereum state data; and by selecting and arranging different key lengths according to a data type, layers of the MPT tree can be effectively reduced, so that the purpose of reducing the number of times of disk io can be achieved.

6 Claims, 8 Drawing Sheets

ETHEREUM STATE DATA STORAGE OPTIMIZATION METHOD, ETHEREUM SYSTEM AND STORAGE MEDIUM

CROSS REFERENCE TO RELATED APPLICATIONS

The present application is a Continuation Application of PCT Application No. PCT/CN2020/080288 filed on Mar. 19, 2020, the contents of which are incorporated herein by reference in their entirety.

FIELD OF THE INVENTION

The present disclosure relates to the technical field of Ethereum, and in particular, to an Ethereum state data storage optimization method, an Ethereum system and a storage medium.

BACKGROUND OF THE INVENTION

Ethereum is an open-source public blockchain platform with smart contract functions, and provides a decentralized Ethereum virtual machine through its dedicated cryptocurrency Ether ("Ether" for short) to process point to point contracts. In Ethereum, data storage is roughly divided into three parts, which are respectively state data, blockchain, and underlying data. The storage architecture of Ethereum is shown in FIG. 1.

The underlying data include all the data in Ethereum stored in the form of key-value pairs ([key, value]), and the currently used database is LevelDB; all data related to transactions and operations are stored on blocks; and the database StateDB is used to manage accounts. According to the system design of Ethereum, StateDB exists between the underlying database module and the business model. The StateDB is oriented to the business model and can flexibly design a variety of storage formats and units according to business needs. Meanwhile, the StateDB is connected to the underlying database. If there is any change in the underlying database (or a third party API), impact on the business model can be greatly reduced. StateDB management is the core of the entire system, and performance of the StateDB directly determines performance of the entire Ethereum. The StateDB is the core interface for account query, and the main member inside the StateDB is a trie tree of trie.Trie type, as shown in FIG. 2. This trie tree structure is also called Merkle-Patrica Trie (MPT tree), and state objects are stored in the MPT tree. Every time before the transaction of a block is started, the trie is restored by a hashNode. The corresponding state object is found in the trie tree based on the account information. The account database of Ethereum mainly functions to make additions, changes and queries to the trie tree.

For the MPT tree for storing state objects, key-value pairs are stored therein. The source of the key is a hash value (a 32-byte array) of an account address (a 2-byte array). The corresponding value of the key is an RLP (recursive length prefix) code of the data stored in the account, and the data structure thereof is shown as the following code snippet. After RLP coding is performed to the account data, the account data becomes a one-byte array and forms, together with the key, a key-value pair which is stored in the underlying database levelDB.
 type Account struct {
  Nonce uint64
  Balance *big.Int
  Root common.Hash II merkle root of the storage trie
  CodeHash [ ]byte
 }

In addition, Merkle-Patrica Trie is also used inside each stateObject in the database StateDB, as shown in FIG. 3.

For each stateObject, its internal MPT tree (also known as Storage Trie) holds various variables that need to be stored inside the smart contract. The MPT tree also adopts a key-value pair mode. The key is the hash value (a 32-byte array) of an address of a smart contract internal variable, and the value is an RLP-coded value of a value of the smart contract internal variable (such as the integer int, or string-type data, etc.). Therefore, for execution of Ethereum smart contracts, performance of the MPT tree is very critical.

To sum up, the principles and code logics of two MPT trees inside the database StateDB are consistent. That is, the two MPT trees both store key-value pairs as data, the key being the hash value of a certain structure, and mainly function to perform database operations such as additions, changes, and queries on the MPT tree. The implementation principle of the MPT tree is shown in FIG. 4.

In actual application scenarios, the main problem of the MPT tree is that as the amount of data increases, a height of the MPT tree gradually expands. At the same time, in Ethereum, the manner of accessing the database StateDB does not follow a relatively fixed pattern (spatial correlation and temporal correlation are both non-significant), but changes with execution of transactions and contracts, or even can be considered as completely random accessing to data. Accordingly, cache performance on the underlying database and the middleware abstraction layer cannot fully function, and each data accessing is accompanied by multiple disk io. Therefore, the main direction for optimizing the database StateDB of Ethereum is to reduce the number of times of disk io as much as possible and utilize the cache to a greater extent.

SUMMARY OF THE INVENTION

The present disclosure provides an Ethereum state data storage optimization method, an Ethereum system and a storage medium. By compressing a height of an MPT tree so as to reduce the number of times of disk io, Ethereum state data storage optimization can be realized.

The technical solutions of the present disclosure are as follows.

According to a first aspect of the present disclosure, an Ethereum state data storage optimization method is provided. The method includes:
 using an MPT tree structure to store Ethereum state data; and
 compressing a height of an MPT tree, so as to reduce the number of times of disk io.

Further, compressing the height of the MPT tree so as to reduce the number of times of disk io includes:
 increasing capacity of a branch node, so as to perform optimization to the MPT tree of the Ethereum state data in a horizontal direction.

Further, increasing the capacity of the branch node so as to perform optimization to the MPT tree of the Ethereum state data in the horizontal direction includes:
 changing coding branches at respective layers of the MPT tree of the Ethereum state data according to a first coding mode to coding branches at respective layers of the MPT tree of the Ethereum state data according to a second coding mode, wherein there are more branches at respective layers of the MPT tree under the second coding mode than under the first coding mode.

Further, increasing the capacity of the branch node so as to perform optimization to the MPT tree of the Ethereum state data in the horizontal direction includes:

changing, if both an upper layer of branches and a lower layer of branches of the MPT tree of the Ethereum state data are full, coding branches at respective layers according to the first coding mode to coding branches at respective layers according to the second coding mode for the upper layer of branches and the lower layer of branches, so that one layer of branches replaces the upper layer of branches and the lower layer of branches, wherein there are more branches at respective layers of the MPT tree under the second coding mode than under the first coding mode.

Further, the first coding mode is Hex 16 coding mode, and the second coding mode is base58 coding mode.

Further, compressing the height of the MPT tree so as to reduce the number of times of disk io includes:

compressing the height of the MPT tree of the Ethereum state data on a single prefix path, so as to perform optimization to the MPT tree of the Ethereum state data in a vertical direction.

Further, compressing the height of the MPT tree of the Ethereum state data on a single prefix path so as to perform optimization to the MPT tree of the Ethereum state data in the vertical direction includes:

merging a value node and a parent node thereof in the MPT tree of the Ethereum state data; and merging a non-leaf node and a child node thereof in the MPT tree of the Ethereum state data.

Further, compressing the height of the MPT tree so as to reduce the number of times of disk io includes:

selecting and arranging different key lengths according to a data type.

Further, the data type includes intelligent contract variable and account data, wherein arranging different key lengths according to the data type includes: arranging a key length, which has fewer bits than a key length of the intelligent contract variable, for the account data.

According to a second aspect of the present disclosure, an Ethereum state data storage optimization system is provided. The system includes:

an MPT tree, used to store Ethereum state data; and a data optimization unit, used to compress a height of the MPT tree, so as to reduce the number of times of disk io.

Further, the data optimization unit includes:

a horizontal optimization module, used to increase capacity of a branch node, so as to perform optimization to the MPT tree of the Ethereum state data in a horizontal direction.

Further, the horizontal optimization module includes:

a coding extension module, used to change coding branches at respective layers of the MPT tree of the Ethereum state data according to a first coding mode to coding branches at respective layers of the MPT tree of the Ethereum state data according to a second coding mode, wherein there are more branches at respective layers of the MPT tree under the second coding mode than under the first coding mode.

Further, the horizontal optimization module is configured to include:

a coding extension module, used to change, when both an upper layer of branches and a lower layer of branches of the MPT tree of the Ethereum state data are full, coding branches at respective layers according to the first coding mode to coding branches at respective layers according to the second coding mode for the upper layer of branches and the lower layer of branches, so that one layer of branches replaces the upper layer of branches and the lower layer of branches, wherein there are more branches at respective layers of the MPT tree under the second coding mode than under the first coding mode.

Further, the first coding mode is Hex 16 coding mode, and the second coding mode is base58 coding mode.

Further, the data optimization unit includes:

a vertical optimization module, used to compress the height of the MPT tree of the Ethereum state data on a single prefix path, so as to perform optimization to the MPT tree of the Ethereum state data in a vertical direction.

Further, the vertical optimization module is configured to:

merge a value node and a parent node thereof in the MPT tree of the Ethereum state data; and merge a non-leaf node and a child node thereof in the MPT tree of the Ethereum state data.

Further, the data optimization unit includes:

a key length arrangement module, used to select and arrange different key lengths according to a data type.

Further, the data type includes intelligent contract variable and account data, wherein the key length arrangement module is further configured to arrange a key length, which has fewer bits than a key length of the intelligent contract variable, for the account data.

According to a third aspect of the present disclosure, an Ethereum system, which stores Ethereum state data therein, is provided. The Ethereum state data is obtained based on the Ethereum state data storage optimization method according to the first aspect of the present disclosure.

According to a fourth aspect of the present disclosure, a computer readable storage medium, which stores instructions executable by a processor thereon, is provided. When the instructions are executed, the processor is enabled to implement an Ethereum state data storage optimization method. The method includes steps of:

using an MPT tree structure to store Ethereum state data; and compressing a height of the MPT tree, so as to reduce the number of times of disk io.

The present disclosure provides an Ethereum state data storage optimization method, an Ethereum system and a storage medium, which compress a height of an MPT tree so as to reduce the number of times of disk io. By increasing capacity of a branch node, optimization in a horizontal direction can be performed to the MPT tree of Ethereum state data; by compressing the height of the MPT tree of the Ethereum state data on a single prefix path, optimization in a vertical direction can be performed to the MPT tree of the Ethereum state data; and by selecting and arranging different key lengths according to a data type, layers of the MPT tree can be effectively reduced, so that the purpose of reducing the number of times of disk io can be achieved. By using technical solutions of the present disclosure, Ethereum state data storage optimization can be achieved; performance of a database can be optimized to the maximum extent; and cache can be utilized to a greater extent, so that speed of data accessing can be improved.

BRIEF DESCRIPTION OF THE DRAWINGS

In order to explain technical solutions of embodiments of the present disclosure more clearly, a simple introduction to the accompanying drawings used in the embodiments will be made below. It should be understood that, the following accompanying drawings only illustrate some embodiments of the present disclosure and thus should not be considered as limitation to the scope of the present disclosure. For those of ordinary skill in the art, other related drawings can also be obtained based on these accompanying drawings without paying creative work.

DETAILED DESCRIPTION OF THE EMBODIMENTS

A clear and complete explanation to technical solutions in embodiments of the present disclosure will be provided below with reference to the accompanying drawings of the embodiments of the present disclosure. Obviously, the embodiments described are only some embodiments of the present disclosure, rather than all embodiments. Generally, components in the embodiments of the present disclosure illustrated and shown in the accompanying drawings may be arranged and designed in various configurations. Hence, the detailed description of the embodiments of present disclosure provided in the accompanying drawings is not intended to limit the scope of the present disclosure, but only illustrates selected embodiments of the present disclosure. All other embodiments obtained by those skilled in the art based on the embodiments of the present disclosure without paying any creative work fall into the protection scope of the present disclosure.

It should be noted that similar reference numbers and letters indicate similar items, and thus once an item is defined in one drawing, there is no need to further define and explain it in subsequent drawings. Besides, in the description of the present application, terms such as "first" and "second" are only used to indicate a difference, and cannot be understood as indicate or imply relative importance.

Embodiment One

Figure 5:
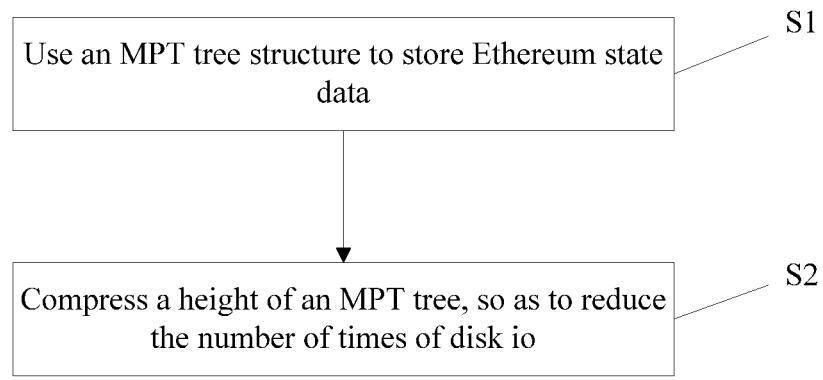
FIG. 5 shows a flowchart of an Ethereum state data storage optimization method provided in Embodiment One of the present disclosure.

According to the present embodiment, an Ethereum state data storage optimization method is provided, as shown in FIG. 5. The method includes:

step S1 of using an MPT tree structure to store Ethereum state data; and step S2 of compressing a height of an MPT tree, so as to reduce the number of times of disk io.

When the MPT tree structure is used to store Ethereum state data, the height of the MPT tree gradually expands as an amount of data increases, and the number of times of disk io also increases, which causes a waste of storage space. In the present embodiment, by compressing the height of the MPT tree so as to reduce the number of times of disk io, the storage space can be utilized to a greater extent.

Embodiment Two

Figure 6:
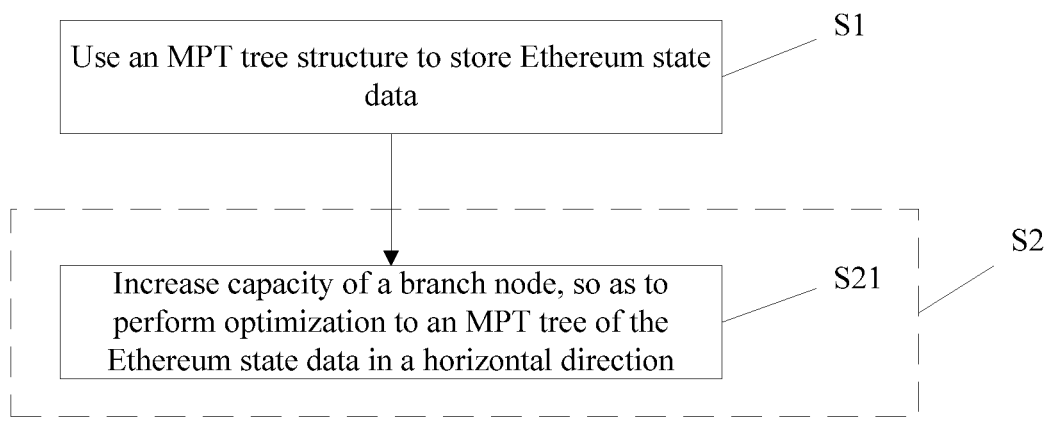
FIG. 6 shows a flowchart of an Ethereum state data storage optimization method provided in Embodiment Two of the present disclosure.

The present embodiment provides an Ethereum state data storage optimization method. Based on Embodiment One, as shown in FIG. 6, step S2 may further include:

step S21 of increasing capacity of a branch node, so as to perform optimization to the MPT tree of the Ethereum state data in a horizontal direction.

Specifically, according to the present embodiment, a first manner for implementing step 21 is provided.

Manner one: Coding branches at respective layers of the MPT tree of the Ethereum state data according to a first coding mode is changed to coding branches at respective layers of the MPT tree of the Ethereum state data according to a second coding mode. There are more branches at respective layers of the MPT tree under the second coding mode than under the first coding mode.

In the present embodiment, by extending the first coding mode to the second coding mode, the number of branches at respective layers of the MPT tree is increased, capacity of branch nodes being increased, a layer height of the branch nodes being reduced, thereby reducing the number of times of disk io, i.e., the number of times of DB loading, for accessing a certain branch node.

Preferably, the first coding mode is Hex 16 coding mode, and the second coding mode is base58 coding mode (the coding format used for BTC). In existing Ethereum system, only the Hex 16 coding mode is used for coding the branches at respective layers of the MPT tree of the Ethereum state data. Thus, for the same amount of Ethereum state data, by increasing the number of branches at respective layers of the MPT tree, the height of the MPT tree can be effectively compressed.

Figure 7:
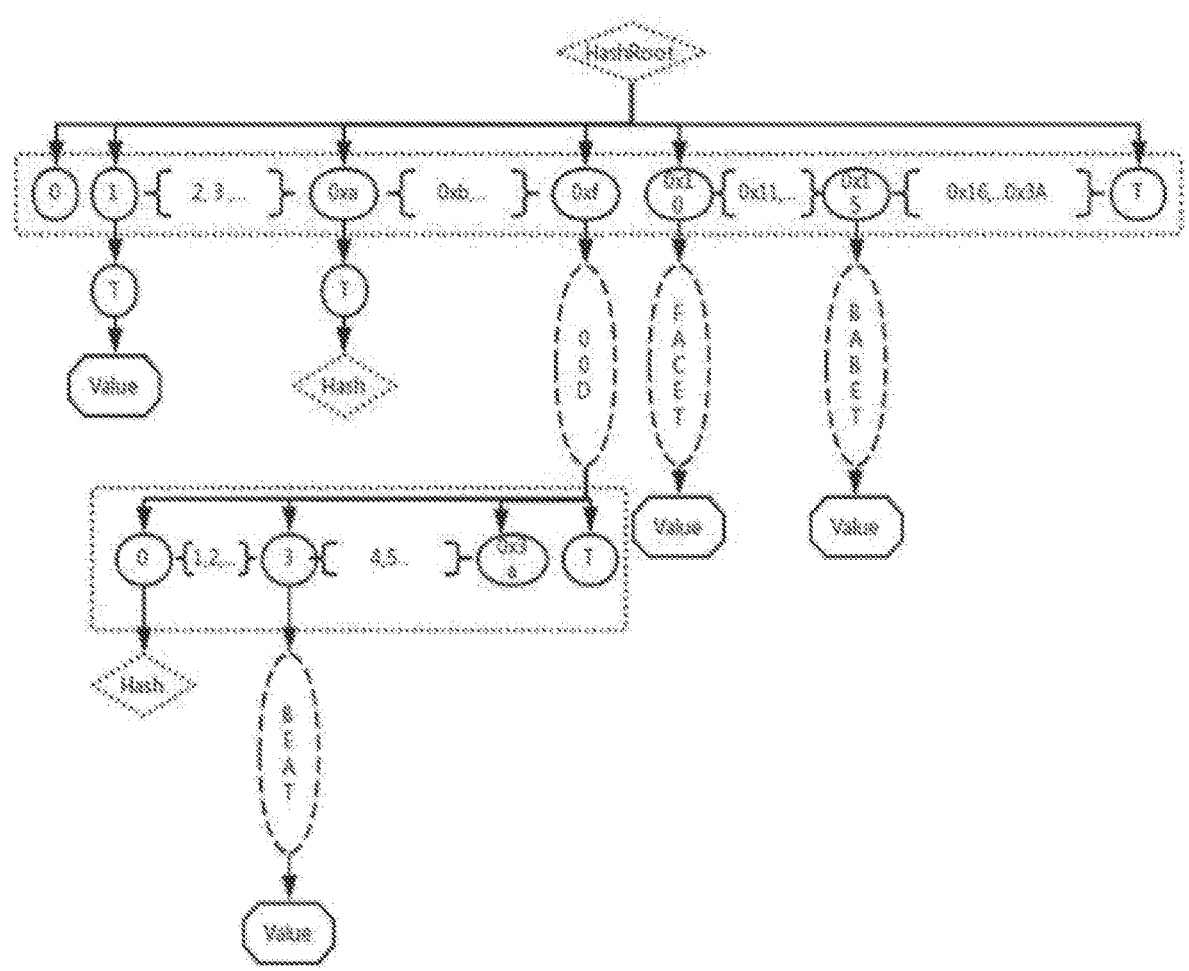
FIG. 7 schematically shows a first manner for performing optimization to an MPT tree of Ethereum state data in a horizontal direction in Embodiment Two of the present disclosure.

Taking FIG. 7 for example, performing optimization to the MPT tree of the Ethereum state data in the horizontal direction is described below.

Figure 1:
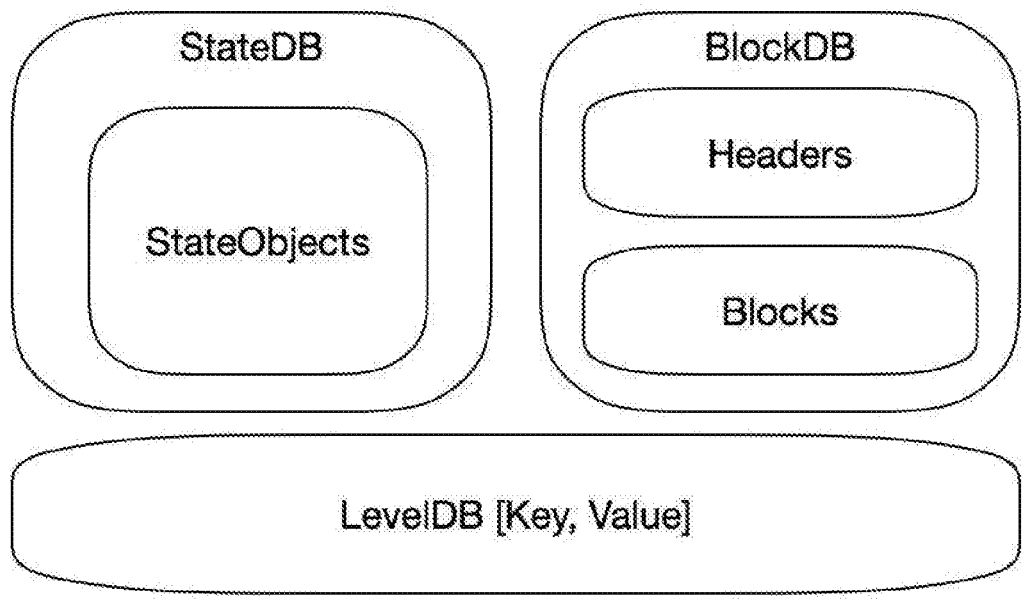
FIG. 1 schematically shows a data storage architecture of Ethereum.
Figure 2:
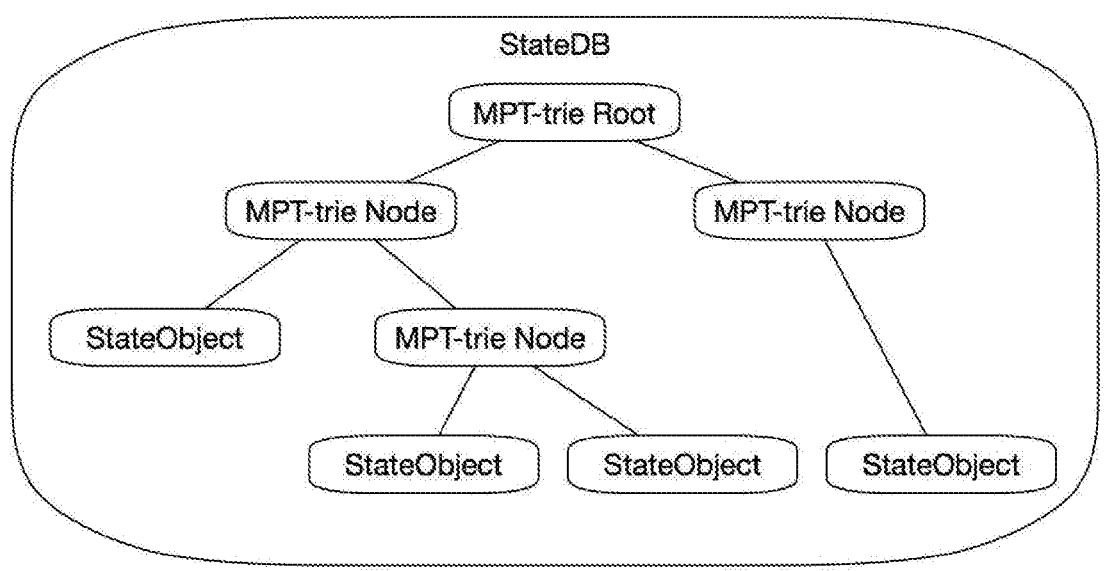
FIG. 2 schematically shows a trie tree of trie.Trie type.
Figure 3:
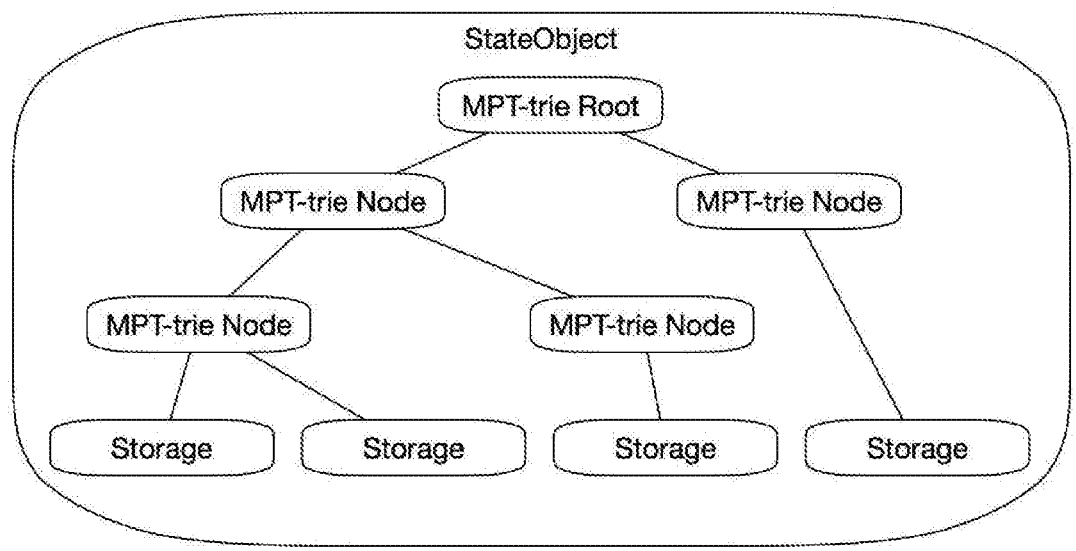
FIG. 3 schematically shows an MPT tree inside a stateObject.
Figure 4:
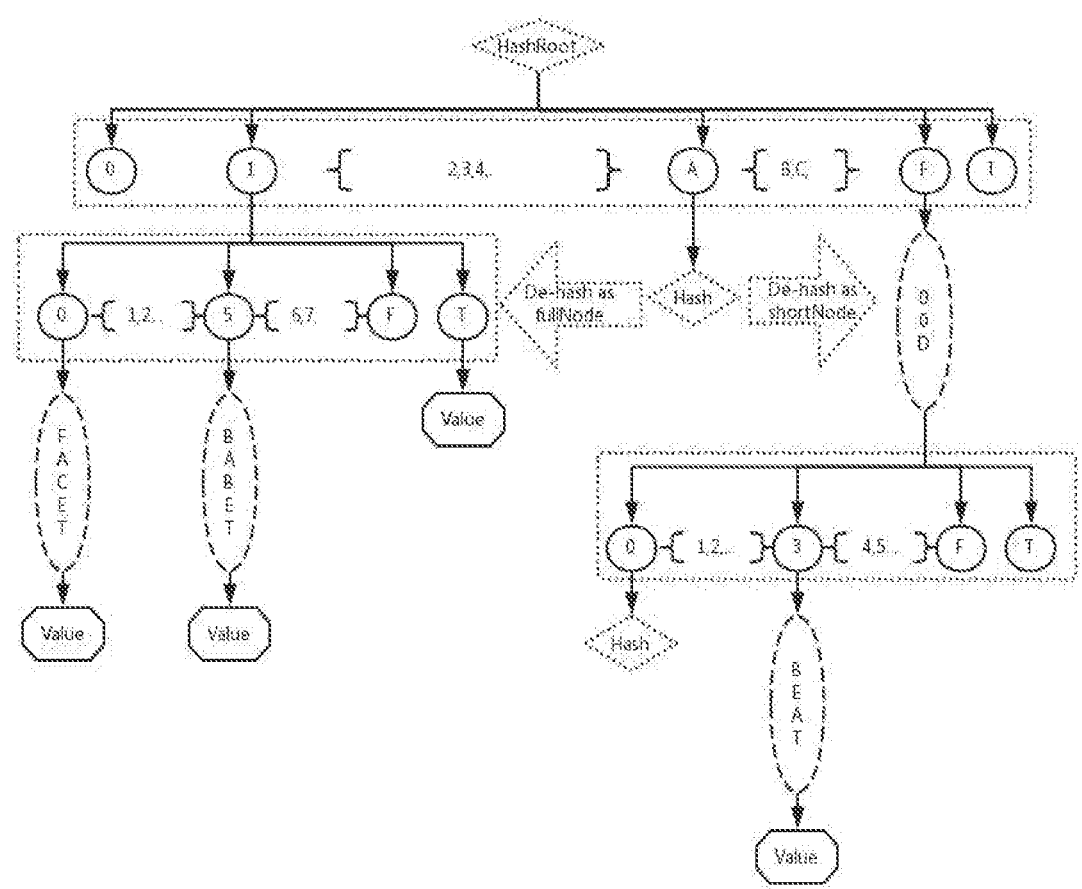
FIG. 4 schematically shows an implementation principle of an MPT tree.

For the same value nodes, the layer height of the value nodes in the MPT tree is 4 (as shown in FIG. 4) before the optimization in the horizontal direction in the present embodiment is performed, while the layer height of the value nodes in the MPT tree is 3 after the optimization is performed, which reduces 25% of the number of times of disk io. It should be noted that key values remain the same in FIG. 7 in order to illustrate a change in the height of the MPT tree, but the key values change correspondingly in an actual optimization process because of a change in the coding mode.

By extending the first coding mode to the second coding mode through the above manner, the number of branches at respective layers of the MPT tree is increased, the capacity of branch nodes being increased, the layer height of the branch nodes being reduced, but performing the optimization in the horizontal direction in the entire MPT tree may result in overexpansion of the storage space. For example, original ordinary storage space of the branch nodes is (8+2+1+17)×8 byte, while the storage space becomes (8+2+1+59)×8 byte, which is roughly 3 times the original storage space, after the base58 coding mode is used for coding. Although the development of internal storage, hardware such as hard disk, and various database and software technologies enables extension of the storage space to be realized easily, it is inevitable that an obvious waste of the storage space is brought.

An analysis to Ethereum account data is made below. Table 1 shows the analysis to the Ethereum account data, in which the row represents the layer height of the MPT tree, and the column represents the number of branches of the nodes at respective layers (the number of branches of the nodes at respective layers is at least 1 and at most 16). As can be seen clearly in Table 1, it is certain that the $0^{th}$ layer, i.e., the root, includes 16 branches, and it is also certain that the $1^{st}$ layer to the $4^{th}$ layer each include 16 branches. In the current case of approximately more than 30 million accounts, it is impossible that some account does not have a common prefix with other accounts at such a low height of the MPT tree (30 million~=2^25, 16==2^4, and in other words, at least a 7-layer height is needed to accommodate so much data under the Hex 16 coding mode), otherwise it only suggests that the hash function selected for the Ethereum system does not have a random average property. From the $5^{th}$ layer, there exists a node having less than 16 branches gradually, which indicates that hash values are truly scattered from this layer.

TABLE 1

| | 0 | 1 | 2 | 3 | 4 | 5 | 6 | 7 | 8 | 9 | 10 | 11 | 12 | TOTAL |
|---|---|---|---|---|---|---|---|---|---|---|---|---|---|---|
| 1 | | | | | | | 5754779 | 18452565 | 2340874 | 144723 | 3350 | 132 | 2 | 26696425 |
| 2 | | | | | | | 4455197 | 1124531 | 72241 | 1675 | 66 | 1 | | 5653711 |
| 3 | | | | | | | 2141036 | 31962 | 86 | | | | | 2173084 |
| 4 | | | | | | 7 | 717227 | 628 | | | | | | 717862 |
| 5 | | | | | | 41 | 177101 | 11 | | | | | | 177153 |
| 6 | | | | | | 304 | 33487 | | | | | | | 33791 |
| 7 | | | | | | 1665 | 4941 | | | | | | | 6609 |
| 8 | | | | | | 7269 | 630 | | | | | | | 7899 |
| 9 | | | | | | 25018 | 60 | | | | | | | 25078 |
| 10 | | | | | | 66040 | 4 | | | | | | | 66044 |
| 11 | | | | | | 137741 | 1 | | | | | | | 137742 |
| 12 | | | | | | 217375 | | | | | | | | 217375 |
| 13 | | | | | | 255579 | | | | | | | | 255579 |
| 14 | | | | | | 207313 | | | | | | | | 207313 |
| 15 | | | | | | 105080 | | | | | | | | 105080 |
| 16 | 1 | 16 | 256 | 4096 | 65538 | 25141 | | | | | | | | 95046 |
| T | 1 | 16 | 256 | 4096 | 65538 | 1048576 | 13284463 | 19609697 | 2413201 | 146398 | 3416 | 133 | 2 | 36575791 |

After the analysis to the Ethereum account data is made above, the present embodiment further optimizes a strategy for optimizing the MPT tree of the Ethereum state data, and provides a second implementation manner for step S21.

Manner two: If both an upper layer of branches and a lower layer of branches of the MPT tree of the Ethereum state data are full, coding branches at respective layers according to the first coding mode is changed to coding branches at respective layers according to the second coding mode for the upper layer of branches and the lower layer of branches, so that one layer of branches replaces the upper layer of branches and the lower layer of branches. There are more branches at respective layers of the MPT tree under the second coding mode than under the first coding mode.

For example, 16 branches at both an upper layer and a lower layer are full, similar to the $0^{th}$ layer and the $1^{st}$ layer in Table 1, and one layer of a node including 256 branches may be used to replace the previous two layers (here, 256 is used only for the convenience of illustrating a compression characteristic, and the coding mode to be actually used as the second coding mode should be determined by taking more limitations into consideration). In this way, there is no waste of the storage space at all, and even saving the storage space is achieved. This is because 256+1 nodes need to be stored previously, but now only one node including 256 branches needs to be stored. The height of the MPT tree is compressed, the number of times of disk io being reduced, and meanwhile there is no waste of the storage space. For those nodes which do not include 16 branches, the original Hex 16 coding mode of the Ethereum system may still be used. By using this manner, space and efficiency are combined adequately.

Figure 8:
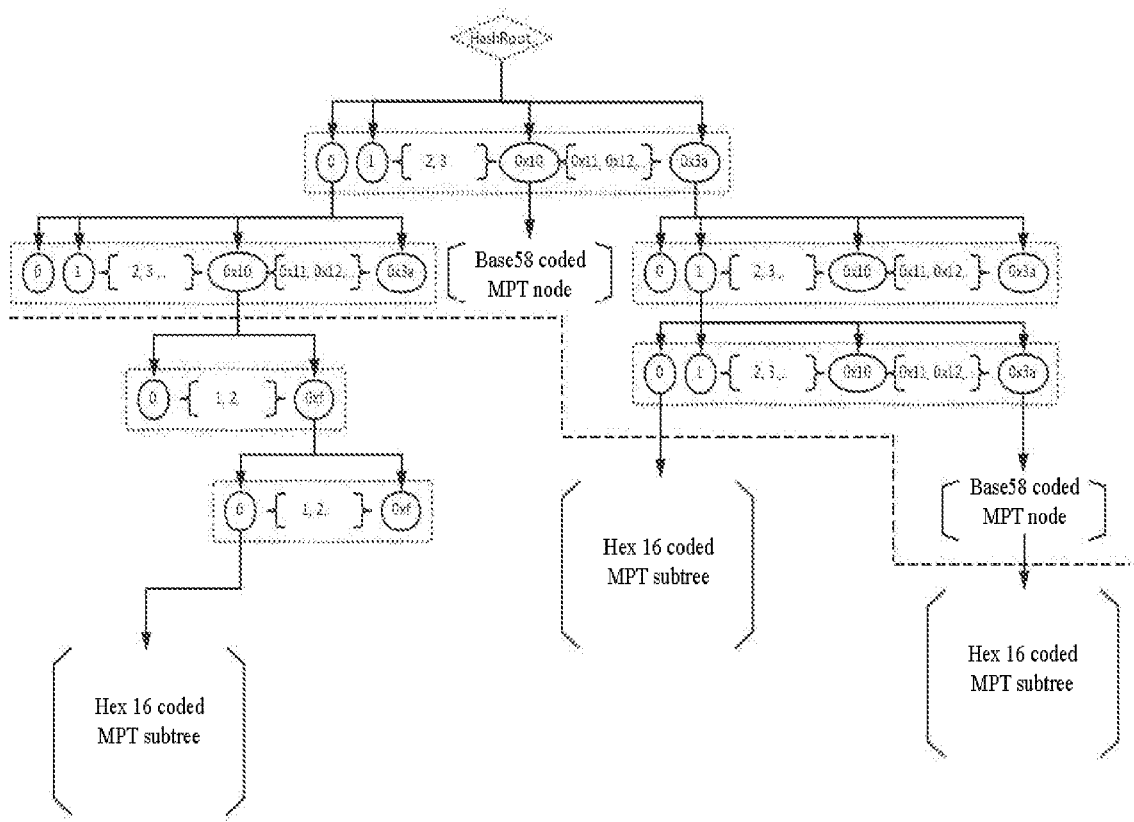
FIG. 8 schematically shows a second manner for performing optimization to the MPT tree of Ethereum state data in the horizontal direction in Embodiment Two of the present disclosure.

In specific implementation, different coding manners may be used according to needs. For example, the first coding mode is Hex 16 coding mode, and the second coding mode is base58 coding mode. For the base58 coding mode, 6 bits (2^6==64>58) are needed. For the 30 million accounts (2^25) in the present Ethereum system, since 25/6==4, little storage space is wasted by coding the uppermost four layers of the MPT tree (corresponding to the $0^{th}$ layer to the $3^{rd}$ layer in Table 1) according to the base58 coding mode. Branches of respective layers from the $4^{th}$ layer are coded according to the original Hex 16 coding mode, and thus the layer height of the subsequent layers remains the same, as shown in FIG. 8. After the manner two is used for performing optimization in the horizontal direction, the number of disk io to a single node is reduced by 2.

Embodiment Three

Figure 9:
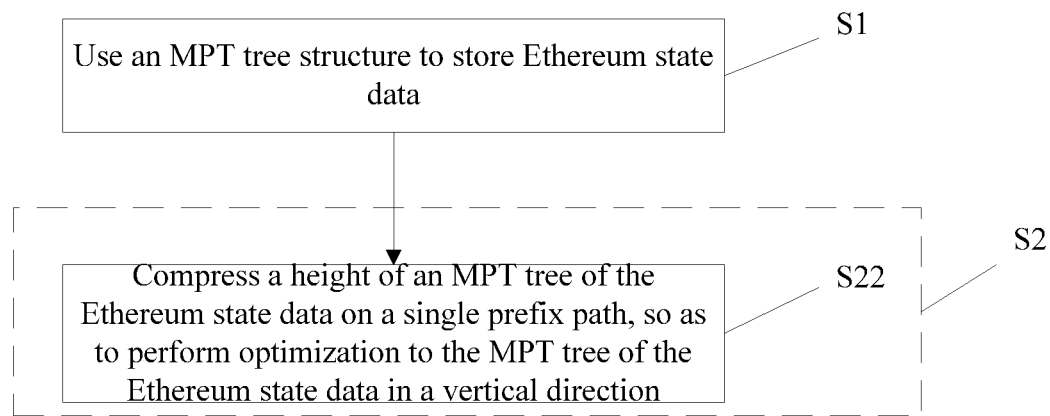
FIG. 9 shows a flowchart of an Ethereum state data storage optimization method provided in Embodiment Three of the present disclosure.

According to the present embodiment, an Ethereum state data storage optimization method is provided. Based on Embodiment One, as shown in FIG. 9, step S2 may further include:

step 22 of compressing the height of the MPT tree of the Ethereum state data on a single prefix path, so as to perform optimization to the MPT tree of the Ethereum state data in a vertical direction.

A short node is designed in the existing Ethereum system, and a non-leaf node and a child node thereof may be merged according to conditions, which compresses the height of the MPT tree on a single prefix path. However, in the present embodiment, a better implementation manner is used to perform optimization to the MPT tree of the Ethereum state data in the vertical direction, thereby extending implementation manners of compressing the height of the MPT tree in the vertical direction.

Specifically, the present embodiment further provides an implementation manner of step S22. That is, step 22 further includes:

merging a value node and a parent node thereof in the MPT tree of the Ethereum state data; and merging a non-leaf node and a child node thereof in the MPT tree of the Ethereum state data.

Figure 10:
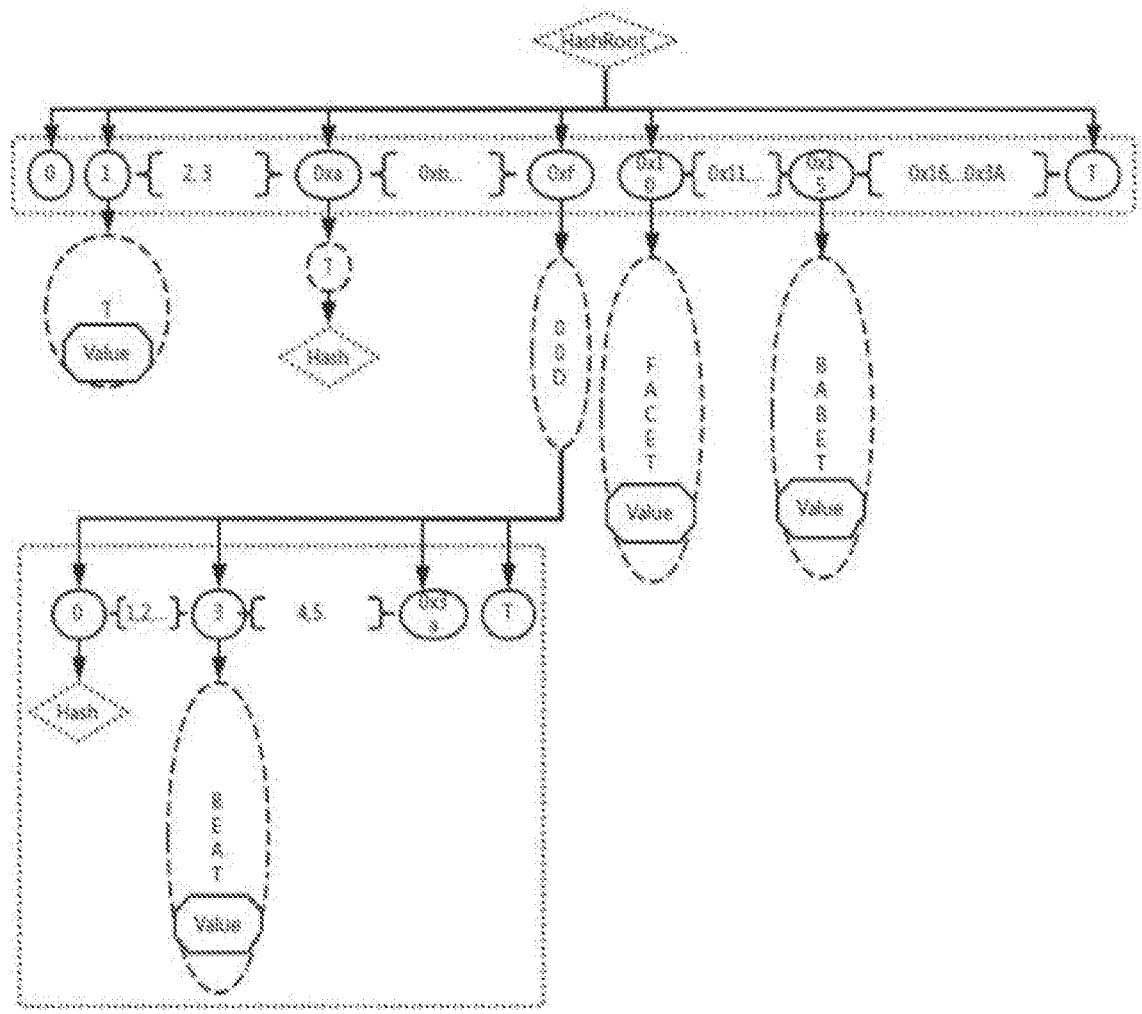
FIG. 10 shows a manner for performing optimization to an MPT tree of Ethereum state data in a vertical direction in Embodiment Three of the present disclosure.

In the present embodiment, value is obtained through one time of disk io by merging a value node and a parent node thereof in the MPT tree of the Ethereum state data, while value is obtained through two times of disk io for the existing Ethereum system. Besides, by merging a non-leaf node and a child node thereof in the MPT tree of the Ethereum state data, information of all branches may be obtained through one time of disk io for a branch node. However, for the existing Ethereum system, the branch node needs to be further parsed, and obtaining and dereference of a hash pointer of a child node of the branch node needs to be performed so as to obtain information of all branches. While the height of the MPT tree is compressed by merging, the number of times of disk io is reduced. As shown in FIG. 10, after optimization to the MPT tree of the Ethereum state data is performed in the vertical direction in the present embodiment, the height of the value node is 2. Compared with the height 3 of the value node in FIG. 7 after the horizontal optimization in the horizontal direction is performed, the height is further reduced; and the number of times of disk io is further reduced.

Embodiment Four

Figure 11:
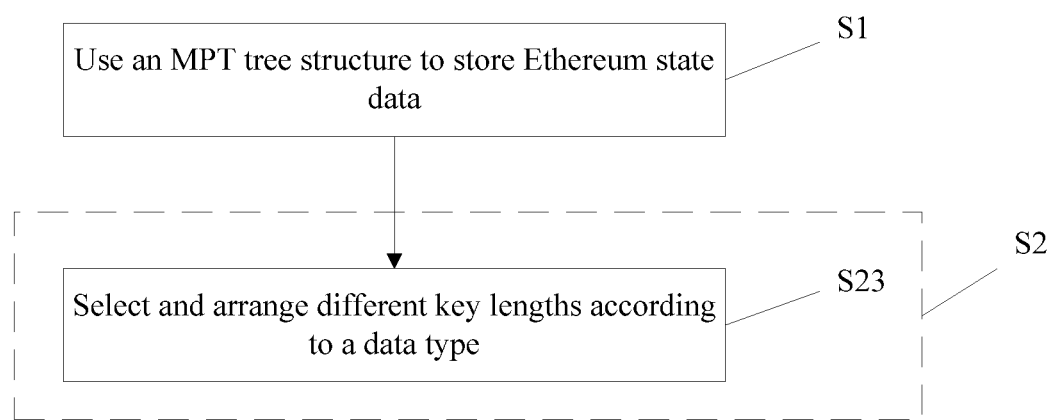
FIG. 11 shows a flowchart of an Ethereum state data storage optimization method provided in Embodiment Four of the present disclosure.

According to the present embodiment, an Ethereum state data storage optimization method is provided. Based on Embodiment One, as shown in FIG. 11, step S2 may further include:

step S23 of selecting and arranging different key lengths according to a data type.

The data type includes intelligent contract variable and account data. Arranging different key lengths according the data type includes arranging a key length, which has fewer bits than a key length of the intelligent contract variable, for the account data.

Figure 12:
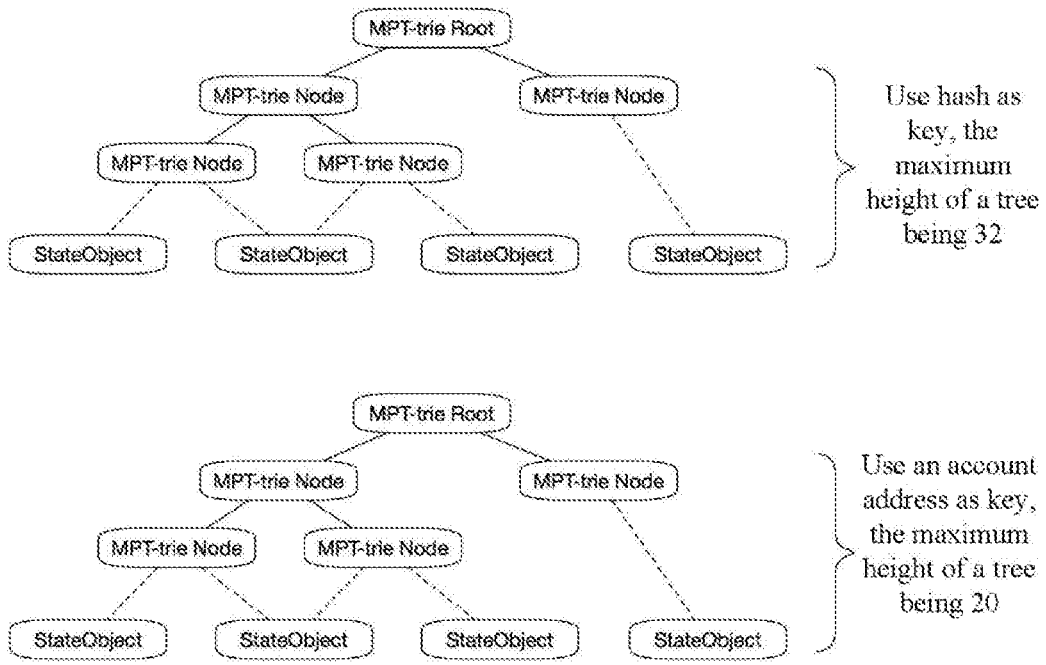
FIG. 12 schematically shows selecting and arranging different key lengths according to a data type in Embodiment Four of the present disclosure.

Different trie trees may be used to organize data that is based on a key-value pair mode according to different key modes, so that the storage space can be saved effectively. At present, for two MPT trees in an Ethereum StateDB, keys inputted are both 32 bits of hash. For the intelligent contract variable, since a length of an intelligent contract variable is not fixed, it is reasonable to use 32 bits as the key length of the intelligent contract variable. However, for the account data, it is sufficient to use 20 bits as the key length of the account data, and using an address of 20 bits as the key can effectively reduce the number of layers of the MPT tree, thereby achieving the aim of reducing the number of times of disk io. As shown in FIG. 12, the key length of the account data in the existing Ethereum system is changed from 32 bits to 20 bits, and the height of the MPT tree is reduced by ⅓; and the number of times of disk io is reduced by ⅓ correspondingly.

Embodiment Five

Figure 13:
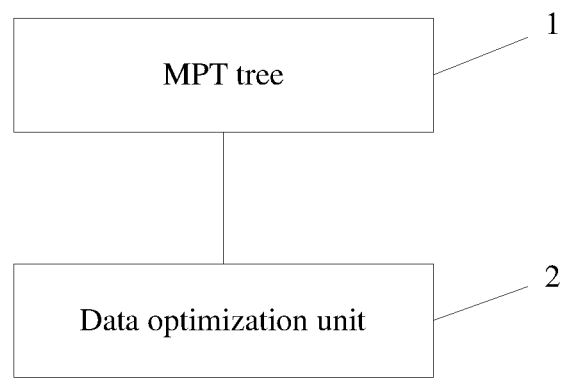
FIG. 13 shows a block diagram of an Ethereum state data storage optimization system provided in Embodiment Five of the present disclosure.

Corresponding to Embodiment One, according to the present embodiment, an Ethereum state data storage optimization system is provided, as shown in FIG. 13. The system includes:

an MPT tree 1, used to store Ethereum state data; and a data optimization unit 2, used to compress a height of the MPT tree, so as to reduce the number of times of disk io.

In the present embodiment, an MPT tree structure is used to store the Ethereum state data, and the data optimization unit 2 is used to compress the height of the MPT tree so as to reduce the number of times of disk io, thereby achieving Ethereum state data storage optimization.

Embodiment Six

Figure 14:
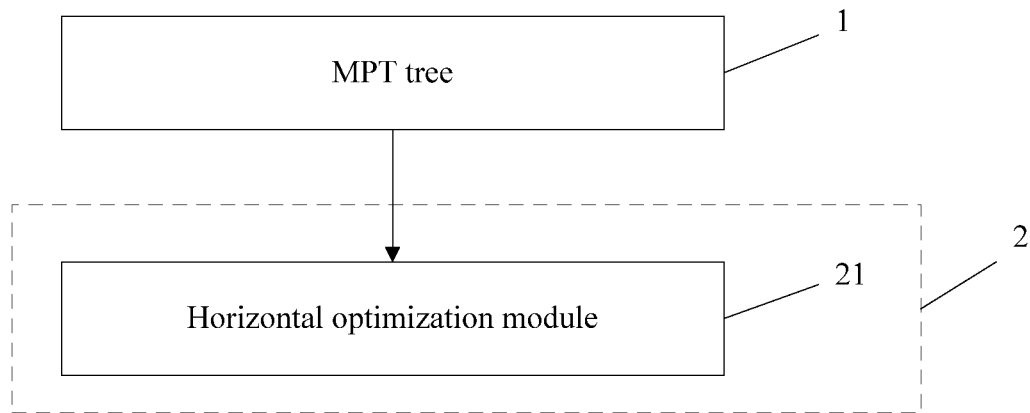
FIG. 14 shows a block diagram of an Ethereum state data storage optimization system provided in Embodiment Six of the present disclosure.

According to the present embodiment, an Ethereum state data storage optimization system is provided, as shown in FIG. 14. Based on Embodiment Five, the data optimization unit 2 further includes:

a horizontal optimization module 21, used to increase capacity of a branch node, so as to perform optimization to the MPT tree of the Ethereum state data in a horizontal direction.

The horizontal optimization module 21 further includes:

a coding extension module, used to change coding branches at respective layers of the MPT tree of the Ethereum state data according to a first coding mode to coding branches at respective layers of the MPT tree of the Ethereum state data according to a second coding mode. There are more branches at respective layers of the MPT tree under the second coding mode than under the first coding mode.

The horizontal optimization module 21 is further configured to include:

a coding extension module, used to change, when both an upper layer of branches and a lower layer of branches of the MPT tree of the Ethereum state data are full, coding branches at respective layers according to the first coding mode to coding branches at respective layers according to the second coding mode for the upper layer of branches and the lower layer of branches, so that one layer of branches replaces the upper layer of branches and the lower layer of branches. There are more branches at respective layers of the MPT tree under the second coding mode than under the first coding mode.

Preferably, the first coding mode is Hex 16 coding mode, and the second coding mode is base58 coding mode.

Coding extension modules in the present embodiment may be configured to carry out two implementation manners of step S21 in foregoing embodiments, and specific contents of the two implementation manners will not be repeated here.

Embodiment Seven

Figure 15:
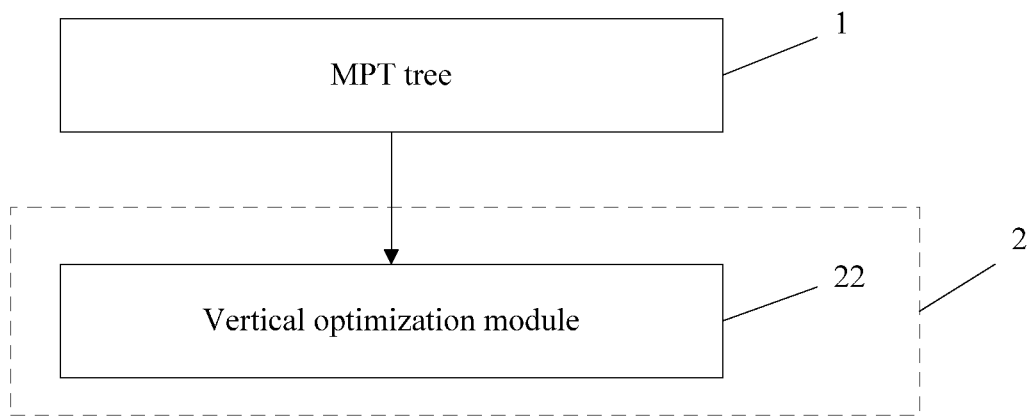
FIG. 15 shows a block diagram of an Ethereum state data storage optimization system provided in Embodiment Seven of the present disclosure.

According to the present embodiment, an Ethereum state data storage optimization system is provided, as shown in FIG. 15. Based on Embodiment Five, the data optimization unit 2 further includes:

a vertical optimization module 22, used to compress the height of the MPT tree of the Ethereum state data on a single prefix path, so as to perform optimization to the MPT tree of the Ethereum state data in a vertical direction.

The vertical optimization module 22 is further configured to:

merge a value node and a parent node thereof in the MPT tree of the Ethereum state data; and merge a non-leaf node and a child node thereof in the MPT tree of the Ethereum state data.

Embodiment Eight

Figure 16:
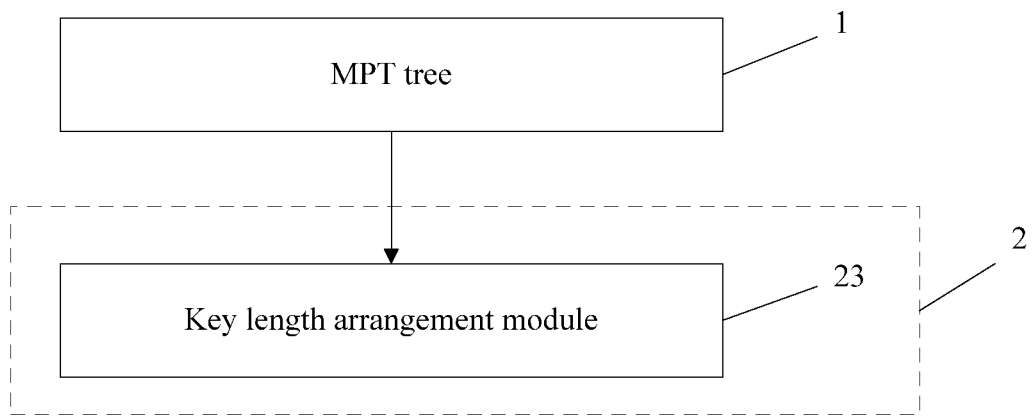
FIG. 16 shows a block diagram of an Ethereum state data storage optimization system provided in Embodiment Eight of the present disclosure.

According to the present embodiment, an Ethereum state data storage optimization system is provided, as shown in FIG. 16. Based on Embodiment Five, the data optimization unit 2 further includes:

a key length arrangement module 23, used to select and arrange different key lengths according to a data type.

Preferably, the data type includes intelligent contract variable and account data. The key length arrangement module 23 is further configured to arrange a key length, which has fewer bits than a key length of the intelligent contract variable, for the account data.

Embodiment Nine

According to the present embodiment, an Ethereum system is provided. The Ethereum system stores Ethereum state data therein, and the Ethereum state data is obtained based on the Ethereum state data storage optimization method in the foregoing embodiments.

Since the Ethereum system in the present embodiment stores the Ethereum state data obtained based on the method in the foregoing embodiments, the number of times of disk io for each data accessing is reduced in actual application scenarios, which utilizes the storage space to a greater extent.

Embodiment Ten

According to the present embodiment, a computer readable storage medium, which stores instructions executable by a processor thereon, is provided, and when the instructions are executed, the processor is enabled to implement an Ethereum state data storage optimization method. The method includes steps of:

using an MPT tree structure to store Ethereum state data; and compressing a height of the MPT tree, so as to reduce the number of times of disk io.

The aforementioned computer readable storage medium may be implemented by any type of volatile devices or non-volatile devices or a combination thereof, such as static random access memory (SRAM for short), electrically erasable programmable read-only memory (EEPROM for short), erasable programmable read-only memory (EPROM for short), programmable read-only memory (PROM for short), read-only memory (ROM for short), magnetic memory, flash memory, magnetic disk and optical disk.

The aforementioned processor may be implemented by application specific integrated circuit (ASIC for short), digital signal processor (DSP for short), digital signal processing device (DSPD for short), programmable logic device (PLD for short), field programmable gate array (FPGA for short), controller, microcontroller, microprocessor and other electronic components, and is used to execute the Ethereum state data storage optimization method in the above embodiments. For the method implemented when the computer programs that run on the processor are executed, reference can be made to the specific embodiments of the Ethereum state data storage optimization method provided by the present disclosure, and details thereof will not be repeated here.

The above descriptions are only specific implementation manners of the present disclosure, and the protection scope of the present disclosure is not limited to this. Any change or replacement that can be easily conceived of by those skilled in the art within the technical scope of the present disclosure should be covered in the protection scope of the present disclosure. Therefore, the protection scope of the present disclosure shall be determined by the scope as defined in the claims.

The invention claimed is:

1. An Ethereum state data storage optimization method, comprising:
   using an MPT tree structure to store Ethereum state data; and
   compressing a height of an MPT tree, so as to reduce the number of times of disk io;
   wherein compressing the height of the MPT tree so as to reduce the number of times of disk io comprises:
   increasing capacity of a branch node, so as to perform optimization to the MPT tree of the Ethereum state data in a horizontal direction;
   wherein increasing the capacity of the branch node so as to perform optimization to the MPT tree of the Ethereum state data in the horizontal direction comprises:
   changing coding branches at respective layers of the MPT tree of the Ethereum state data according to a first coding mode to coding branches at respective layers of the MPT tree of the Ethereum state data according to a second coding mode, wherein there are more branches at respective layers of the MPT tree under the second coding mode than under the first coding mode.

2. The method according to claim 1, wherein increasing the capacity of the branch node so as to perform optimization to the MPT tree of the Ethereum state data in the horizontal direction comprises:
   changing, when both an upper layer of branches and a lower layer of branches of the MPT tree of the Ethereum state data are full, coding branches at respective layers according to the first coding mode to coding branches at respective layers according to the second coding mode for the upper layer of branches and the lower layer of branches, so that one layer of branches replaces the upper layer of branches and the lower layer of branches, wherein there are more branches at respective layers of the MPT tree under the second coding mode than under the first coding mode.

3. The method according to claim 1, wherein the first coding mode is Hex 16 coding mode, and the second coding mode is base58 coding mode.

4. An Ethereum state data storage optimization method, comprising:
   using an MPT tree structure to store Ethereum state data; and
   compressing a height of an MPT tree, so as to reduce the number of times of disk io;
   wherein compressing the height of the MPT tree so as to reduce the number of times of disk io comprises:
   compressing the height of the MPT tree of the Ethereum state data on a single prefix path, so as to perform optimization to the MPT tree of the Ethereum state data in a vertical direction;
   wherein compressing the height of the MPT tree of the Ethereum state data on a single prefix path so as to perform optimization to the MPT tree of the Ethereum state data in the vertical direction comprises:
   merging a value node and a parent node thereof in the MPT tree of the Ethereum state data; and
   merging a non-leaf node and a child node thereof in the MPT tree of the Ethereum state data.

5. An Ethereum state data storage optimization method, comprising:
   using an MPT tree structure to store Ethereum state data; and
   compressing a height of an MPT tree, so as to reduce the number of times of disk io;
   wherein compressing the height of the MPT tree so as to reduce the number of times of disk io comprises:
   selecting and arranging different key lengths according to a data type;
   wherein the data type includes intelligent contract variable and account data, wherein arranging different key lengths according to the data type comprises: arranging a key length, which has fewer bits than a key length of the intelligent contract variable, for the account data.

6. A non-transitory computer readable storage medium, which stores instructions executable by a processor thereon, wherein when the instructions are executed, the processor is enabled to implement the Ethereum state data storage optimization method according to claim 1.

* * * * *